United States Patent [19]

Anderson et al.

[11] Patent Number: 4,764,317
[45] Date of Patent: Aug. 16, 1988

[54] MICROENCAPSULATION PROCESS AND APPARATUS

[75] Inventors: Eugene L. Anderson; William W. Harlowe, Jr.; Leon M. Adams; Mary C. Marshall, all of San Antonio, Tex.

[73] Assignee: Southwest Research Institute, San Antonio, Tex.

[21] Appl. No.: 578,653

[22] Filed: Feb. 9, 1984

[51] Int. Cl.$^4$ .............................................. B29B 9/10
[52] U.S. Cl. ........................................... 264/4; 425/5
[58] Field of Search ..................... 264/4, 8, 130, 131; 425/5, 8, 10

[56] References Cited

U.S. PATENT DOCUMENTS

| | | | |
|---|---|---|---|
| 884,571 | 4/1908 | Cowing | 425/8 |
| 2,379,817 | 7/1945 | Mabbs | 425/5 |
| 2,436,439 | 2/1948 | Lincoln et al. | 425/5 |
| 2,531,986 | 11/1950 | Pile et al. | 425/5 |
| 2,756,177 | 7/1956 | Cannalonga et al. | 167/81 |
| 2,880,456 | 4/1959 | Kuzela et al. | 425/8 |
| 3,015,128 | 1/1962 | Somerville, Jr. | 425/5 |
| 3,272,893 | 9/1966 | Mogensen | 425/8 |
| 3,287,472 | 11/1966 | Wolf et al. | 425/8 |
| 3,293,695 | 12/1966 | Baymiller et al. | 425/8 |
| 3,310,612 | 3/1967 | Sommerville | 264/4 |
| 3,389,194 | 6/1968 | Somerville | 264/4 |
| 3,423,489 | 1/1969 | Arens et al. | 264/4 |
| 3,607,993 | 9/1971 | Tuttle | 264/8 |
| 4,096,944 | 8/1978 | Simpson | 206/219 |
| 4,123,206 | 10/1978 | Dannelly | 425/5 |
| 4,256,677 | 3/1981 | Lee | 425/8 |

FOREIGN PATENT DOCUMENTS 873757 7/1961 United Kingdom ................... 425/5

Primary Examiner—Jan H. Silbaugh
Assistant Examiner—MaryLynn Fertig
Attorney, Agent, or Firm—Sigalos & Levine

[57] ABSTRACT

A process for collecting microcapsules containing a liquid fill formed by an encapsulation head comprising maintaining a rotating substantially uniform layer of a cushioning powder between a capsule forming zone and a capsule collecting zone, expelling capsules as formed from the capsule forming zone onto a uniform layer of cushioning powder, and moving the capsules radially along said layer and the capsule collecting zone. The invention also comprises the apparatus involved which comprises an encapsulation head for expelling capsules, a powder-coated platform located below the encapsulation head for receiving said expelled capsules, means for rotating said platform to cause said capsules to move radially and fall from said platform, and a moving surface located below said platform to collect said capsules falling from said platform.

16 Claims, 1 Drawing Sheet

U.S. Patent        Aug. 16, 1988        4,764,317
FIG. 1
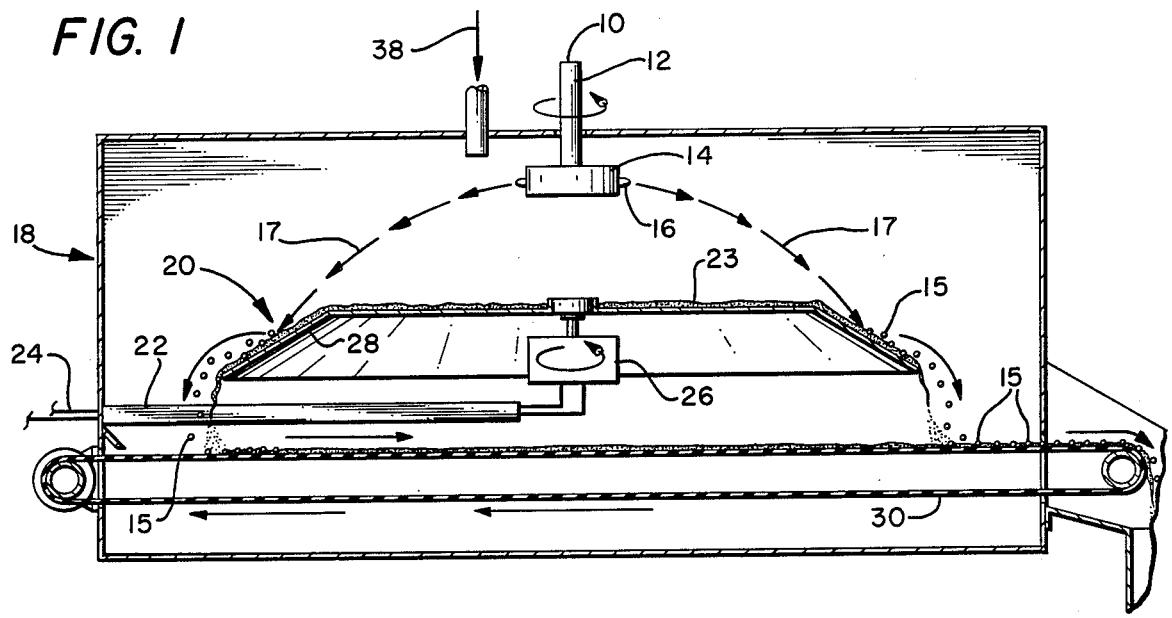
FIG. 2
FIG. 3
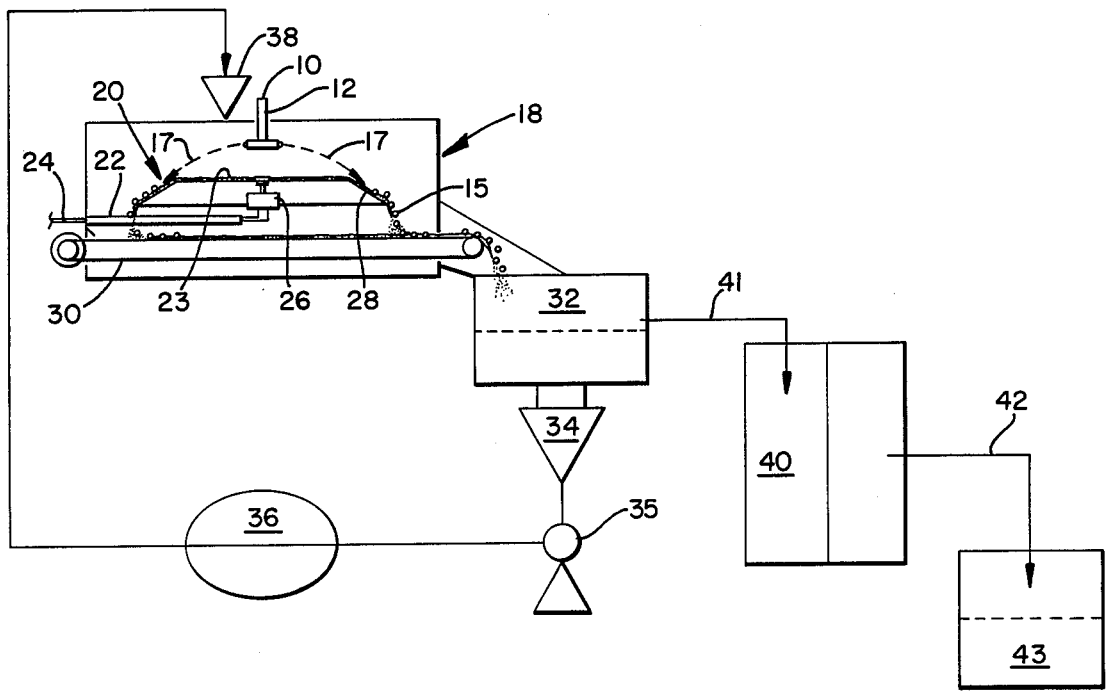

MICROENCAPSULATION PROCESS AND APPARATUS

BACKGROUND OF THE INVENTION

At the present time one successful system for collecting capsules having a liquid fill surrounded by at least one layer of substantially rigid shell material comprises extruding capsules from an encapsulation head onto a vibrating conveyor covered with varying amounts of a cushioning and coating powder, such as starch. This mixture of powder and capsules is then conveyed to a vibrating sieve where the capsules overflow into a fluid bed dryer for final moisture removal before packaging. The underflow (starch) is recycled through a dryer to remove process moisture and delivered back to the vibrating conveyor. Such a process is set forth in U.S. Pat. Nos. 3,015,128, 3,310,612, and 3,389,194.

While generally satisfactory, this process is not entirely suitable because of a commercially significant amount of capsule breakage. This is due in large measure to the fact that the capsules expelled tend to collide with and rupture previously expelled capsules already on the conveyor. Also, the current vibrating system does not always provide sufficient uniform coverage of the cushioning powder in the impact zone to prevent capsule breakage, and as a result the capsules break and wetting of the starch with the liquid fill occurs necessitating process shutdown and cleanup.

Another capsule collection system has been described in U.S. Pat. No. 2,756,177. However, it is not a continuous process and still does not overcome capsule breakage because of the fact that the capsules must drop vertically onto a flat collector.

SUMMARY OF THE INVENTION

The present invention remedies these deficiencies and provides a continuous collection system for microcasules with a liquid fill which protects the capsules and reduces capsule breakage.

Briefly stated, the present invention involves a continuous process for the production and collection of microcapsules containing a liquid fill comprising collecting formed microcapsules on a substantially uniform rotating layer of a cushioning powder which radially transports the collected capsules away from the capsule impact zone and onto a moving surface which carries the capsules and cushioning powder to a separating device.

The invention also comprises the apparatus involved in collecting the capsules as more fully described below.

DESCRIPTION OF THE DRAWINGS

FIG. 1 is a side elevational view of the apparatus of the present invention showing the rotating platform located intermediate to the capsule extrusion means and capsule collecting means;

FIG. 2 is an enlargement of the support stand for the platform motor depicted in FIG. 1 showing the power connections; and FIG. 3 is a schematic representation of a process flow of the present invention for a continuous, dry, free-flowing solids bed system for producing and collecting capsules.

DETAILED DESCRIPTION

The present invention involves an improved, dry free-flowing solids bed system for continuously collecting newly formed microcapsules with a liquid fill. An important object of the invention is to provide an improved impact zone coverage for the capsules utilizing a powder-coated rotating platform as the impact zone.

The powder used in the process to cover the rotating platform can be any free-flowing and preferably hydrophobic material such as a starch or a starch modified so as to impart free-flowing and hydrophobic properties. In a preferred embodiment of the invention, the powder used to coat the rotating platform consists substantially of a starch modified to contain hydrophobic groups so as to possess the properties of free flow and resistance to water-wetting to a higher degree than unmodified starch. An example of a starch/powder of this type is available commercially under the designation Dry-Flo and distributed by National Starch Products, Inc., New York, N.Y.

Referring to the drawings, in the present invention the shell and fill materials 10 are fed into a conventional centrifugal extrusion encapsulation head 14 wherein the capsules 15 are formed and expelled. As head 14 rotates, nodes form on the extruded "rods" or "nozzles" 16 of head 14 and eventually break off as capsules 15. The size of the capsules 15 produced is a function of the feed rate and rotational speed and nature of the fill and shell materials 10. A typical nozzle 16 can produce capsules in the 500 to 1000 1micron range.

Once produced, the capsules 15 fall along trajectory 17 and impact on the periphery 28 of a powder-coated rotating platform 20. This platform 20 is located below encapsulation head 14 and above a moving collection surface 30, such as a conveyor belt or a vibrating surface. In a preferred embodiment of the invention, the platform 20 is rotated by a motor 26 located below the rotating platform 20 and operatively connected to said platform 20 by means of support stand 22. This support stand 22 is attached to a frame 18 from which the motor power connections 24 extend. In a test study, the platform had approximately a 20 rpm rotational motion which did distribute the powder 23 uniformly toward the periphery of the rotating platform 20. The capsules 15 move radially away from the point of impact and thus are not exposed to collisions with other capsules, these collisions cause breakage and agglomeration of the capsules 20 in the prior art. The capsules 20 then fall from the rotating platform 20 onto a moving surface 30 located below said platform 20. By controlling the speed of revolution of platform 20 and the starch pumping rate (as will be described below in relation to FIG. 3), a fairly uniform defined powder 23 can be provided to collect the fragile capsules 15 produced.

As best seen in FIG. 2, the support stand 22 is in the shape of an inverted "V" and has two functions. First, the inverted "V" forms an angled surface against which the capsules may impact, thus reducing chances of breakage as the capsules impact. Secondly, the power controls 24 for motor 26, such as electrical leads or air passages or hoses, are located under the inverted "V" for connection to motor 26.

The periphery 28 of the rotating platform 20 should be slanted at a slight downward slope, generally from 5° to 30°. This downward slope enhances the removal of starch 23 and capsule 15 from the platform 20 while minimizing the capsule impact angle and thus reduces the force of impact and breakage of the capsules 15.

As can best be seen in FIG. 3, after the starch 23 and capsules 15 are dropped onto a vibrating conveyor belt 30, they are conveyed to a vibrating screen 32 where the starch 23 is removed and capsules 15 overflow to a fluid bed dryer 40 along path 41 for final moisture removal. After drying, the capsules 15 can be conveyed to another screen 43 along path 42 for additional sifting. The starch is collected at 34 and is recycled back by any well known means such as a starch conveyor 35 through a flash dryer 36 to remove sorbed process moisture, deposited in the conveyor hopper 38, and travels to the impact zone on the rotating platform 20. A continuous flow of capsules 15 is carried downstream for continuous processing. FIG. 3 represents the typical continuous process flow diagram.

The invention will be further illustrated in conjunction with the following examples, which are set forth for purposes of illustration only and not by way of limitation.

EXAMPLE 1

A shell composition is formed of the following components:

|  | Wt. Percent |
| --- | --- |
| Poly(vinyl alcohol) | 8.0 |
| Carrageenan | 1.0 |
| Surfactant | 0.35 |
| Sodium Benzoate | 0.02 |
| Deionized Water | Balance |

The poly(vinyl alcohol) alcohol used is Monsanto Corporation's grade 3,000; 85.5-88.7 percent hydrolyzed, and the carrageenan is FMC Corporation's grade GH.

The shell solution fed to the conventional centrifugal encapsulation head 14 is formed in the conventional manner. More particularly, all the components are added to a conventional reaction vessel equipped with stirring means and capable of being heated and cooled. The solids are dispersed in the liquid and heat applied with stirring until all the components are dissolved. The solution is then cooled to the optimum capsule forming temperature; about 120° to 160° F., with the minimum of agitation to avoid entrapping air bubbles in the solution.

The cooled shell solution is then fed to the encapsulation head 14 together with the immiscible filler material; in this case a fragrance which is immiscible with the aqueous shell solution. The capsules once formed fall along a trajectory which causes them to impact on the powder-coated periphery 28 of platform 20. It is found that the capsules thus formed have a much lower incidence of breakage (rupture) than capsules extruded directly onto a vibrating conveyor or any flat surface.

EXAMPLES 2-4

The composition and process of Example 1 are followed, except that the poly(vinyl alcohol) and carrageenan used therein are separately and in turn replaced by those combinations set forth below and in the weight percent set forth:

|  | Wt. Percent |
| --- | --- |
| 2. Poly(vinyl alcohol), grade 3-83, 80.4-84.8 percent hydrolyzed (American Hoechst Corporation) | 12-17 |
| Carrageenan, grade 555 (FMC Corporation) | 1-1.5 |
| 3. Poly(vinyl alcohol), grade 26-88, 87.2-88.8 percent hydrolyzed (American Hoechst Corporation) | 7-8 |
| Carrageenan, grade HWG (FMC Corporation) | 1-1.5 |
| 4. Poly(vinyl alcohol), grade 20-30, 85.5-88.7 percent hydrolyzed (Montsanto Corporation) | 7-8 |
| Carrageenan, grade GH | 1-1.5 |

In each instance microcapsules are formed with insignificant amounts of rupture.

It will be evident that the material to be encapsulated can be any material immiscible with the shell solution; such as oils and fragrance.

It will be also evident to those skilled in this art that other shell-forming materials can be used and that dependent upon the particular components chosen, and the proportions thereof, a wide variety of capsule properties can be obtained. The present invention permits in all instances capsule formation with less breakage.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A continuous process for production and collection of microcapsules containing a liquid fill comprising the steps of:
   (a) maintaining a rotating substantially uniform defined layer of a cushioning powder between a capsule forming zone and a capsule collecting zone;
   (b) expelling the formed capsules from said capsule forming zone to impact said uniform layer of cushioning powder; and
   (c) moving said capsules radially along said powder layer onto a moving surface in said capsule collecting zone.

2. A continuous process for production and collection of microcapsules containing a liquid fill comprising the steps of:
   (a) maintaining a rotating substantially uniform defined layer of a cushioning powder between a capsule forming zone and a capsule collecting zone;
   (b) expelling the formed capsules from said capsule forming zone to impact said uniform layer of cushioning powder;
   (c) slanting the periphery of said rotating layer of cushioning powder downwardly at the point where said capsules impact said powder; and
   (d) moving said capsules radially along said powder layer onto a moving surface in said capsule collecting zone.

3. The process of claim 2 wherein the downward slant is in the range of about 5° to 30°.

4. The process of claim 2 wherein the cushioning powder is a starch.

5. The process of claim 4 further including the step of rotating said cushioning powder at a speed sufficient to substantially uniformly distribute the powder toward the periphery of the defined powder layer.

6. A process for continuously collecting microcapsules containing a liquid fill being continuously expelled from an extrusion encapsulation head comprising the steps of:

(a) continuously expelling the capsules from said encapsulation head;
(b) maintaining a rotating substantially uniform defined layer of a cushioning powder below said encapsulation head to receive the expelled capsules;
(c) rotating said layer at a speed sufficient to maintain the powder substantially uniformly distributed in the layer and moving toward the periphery of the layer;
(d) slanting the periphery of the rotating layer at a downward slope in the range of about 5° to 30°; and
(e) collecting such expelled capsules as they leave said cushioning powder layer.

7. Apparatus for continuosly collecting capsules from an encapsulation head comprising:
(a) a rotatable horizontal platform located below said encapsulation head;
(b) means for continuously supplying cushioning powder to the surface of said rotatable horizontal platform;
(c) means for rotating said platform to form a uniform layer of cushioning powder in motion radially outwardly so that capsules from said encapsulation head impact on said moving layer of cushioning powder and are transported thereby off the periphery of said platform; and
(d) a moving surface located below said platform for collecting said capsules as they drop from the periphery of said platform.

8. The apparatus of claim 7 wherein said encapsulation head is a rotating centrifugal extrusion encapsulation head located substantially coaxially above said rotating platfom for constantly expelling capsules with trajectories for landing onto said cushioning powder on said periphery of said platform.

9. The apparatus of claim 7 wherein said moving surface is a conveyor belt.

10. The apparatus of claim 7 wherein the means for rotating said platform is a motor located below said platform and operatively connected to said platform by means of a support stand.

11. The apparatus of claim 7 wherein said rotating platform has a downwardly slanting periphery at the point at which said expelled capsules impact said cushioning powder layer on said platform.

12. The apparatus of claim 11 wherein said downward slant of said periphery of said platform is in the range of 5° to 30° from horizontal.

13. An apparatus for continuously collecting capsules comprising:
(a) a centrifugal extrusion encapsulation head for expelling capsules;
(b) a platform having a continuously outwardly moving layer of a powdered starch thereon located below said head and having a periphery formed with a slight downward slope in the range of about 5° to 30°;
(c) motive means connected to said platform for rotating said platform such that the capsules expelled from the encapsulation head impact said outwardly moving layer of starch and are moved radially outwardly and downwardly with said starch off of said sloping periphery of said platform; and
(d) a moving conveyor belt located below said platform such that said starch and said capsules fall from said platform to said moving conveyor belt whereby said capsules are continuously collected.

14. Apparatus for continuously collecting capsules expelled from an encapsulation head comprising:
(a) a rotatable platform located below said encapsulation head for receiving said expelled capsules thereon; and
(b) means for maintaining a substantially uniform layer of a cushioning powder on said rotatable platform for cushioning the impact of said expelled capsules as they are received.

15. The apparatus of claim 14 further including:
(a) menas for rotating said platform such that said capsules impact on said substantially uniform layer of cushioning powder in motion outwardly by centrifugal force on said rotating platform; and
(b) means for collecting said capsules as they are carried by said powder and drop from said platform.

16. Apparatus as in claim 15 wherein said means for collecting capsules further includes a moving surface located below said rotating platform such that said capsules are collected on said moving surface as they drop from said platform.

* * * * *